United States Patent [19]
Weiss et al.

[11] Patent Number: 5,272,944
[45] Date of Patent: Dec. 28, 1993

[54] ANTI CROSS THREAD DEVICE

[75] Inventors: Ronald G. Weiss, Taylor; Jonathon P. Schmidt, Dearborn, both of Mich.

[73] Assignee: Ford Motor Company, Darborn, Mich.

[21] Appl. No.: 990,386

[22] Filed: Dec. 14, 1992

[51] Int. Cl.⁵ .............................................. B25B 23/00
[52] U.S. Cl. ...................................... 81/462; 81/180.1
[58] Field of Search .................. 81/180.1, 462, 55, 13

[56] References Cited

U.S. PATENT DOCUMENTS

| 609,324 | 8/1898 | Atkinson. |
| 1,097,288 | 5/1914 | Bidinger. |
| 1,270,766 | 7/1918 | Armstrong. |
| 1,282,523 | 10/1918 | Bauer. |
| 1,426,682 | 8/1922 | Snell. |
| 2,040,713 | 5/1936 | Shaffer. |
| 3,277,749 | 10/1966 | Osburn et al.. |
| 4,048,875 | 9/1977 | Heinen et al.. |
| 4,106,373 | 8/1978 | Trongo ............................ 87/462 X |
| 4,334,443 | 6/1982 | Pearson. |
| 5,138,914 | 8/1992 | Brickner ..................... 87/180.1 X |

Primary Examiner—James G. Smith
Attorney, Agent, or Firm—Daniel M. Stock; Roger L. May

[57] ABSTRACT

A wrench tool for preventing cross threading during engagement of nuts with studs is provided. A driving body receives the nut and alignment with the stud is effected through a locating assembly pivotally connected to the driving body. The locating assembly is moved out of engagement with the stud by the movement of the driving body in the tightening direction.

8 Claims, 2 Drawing Sheets

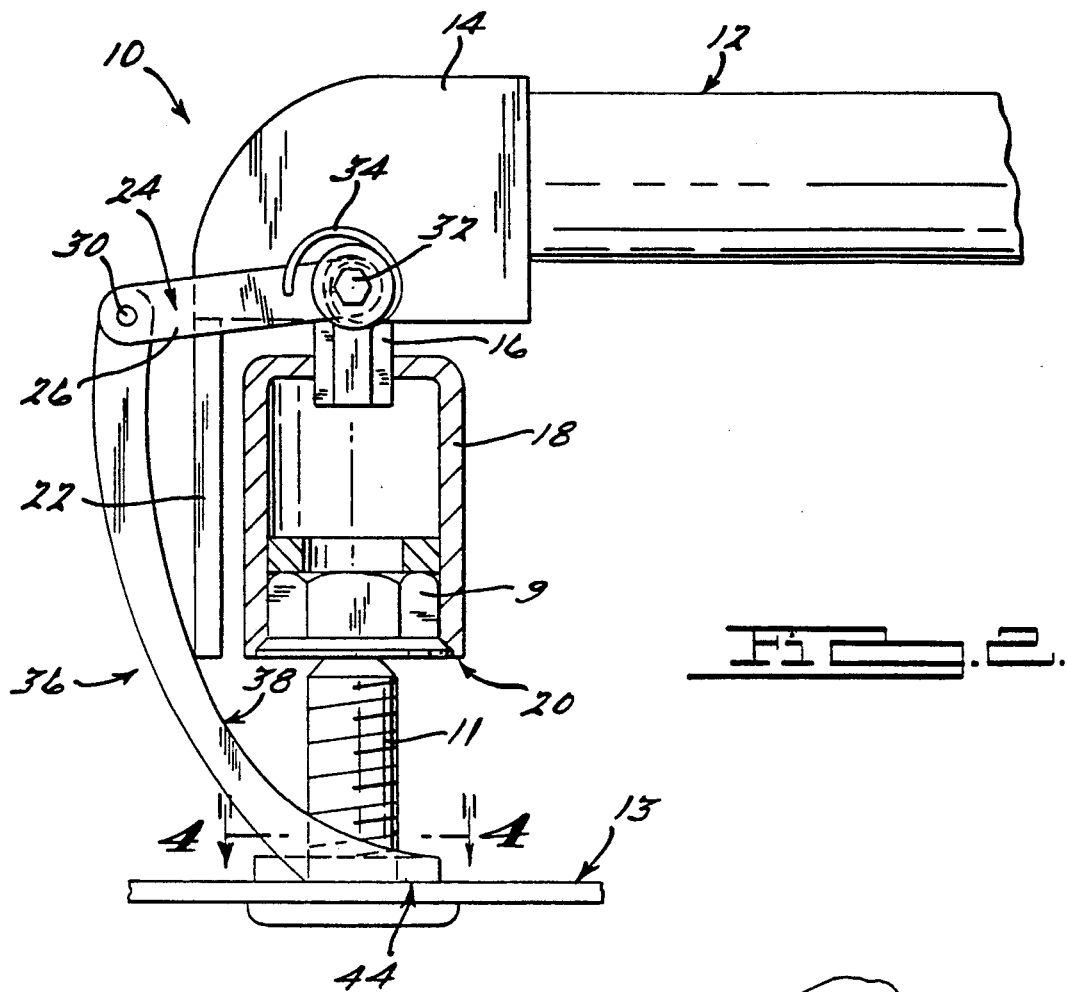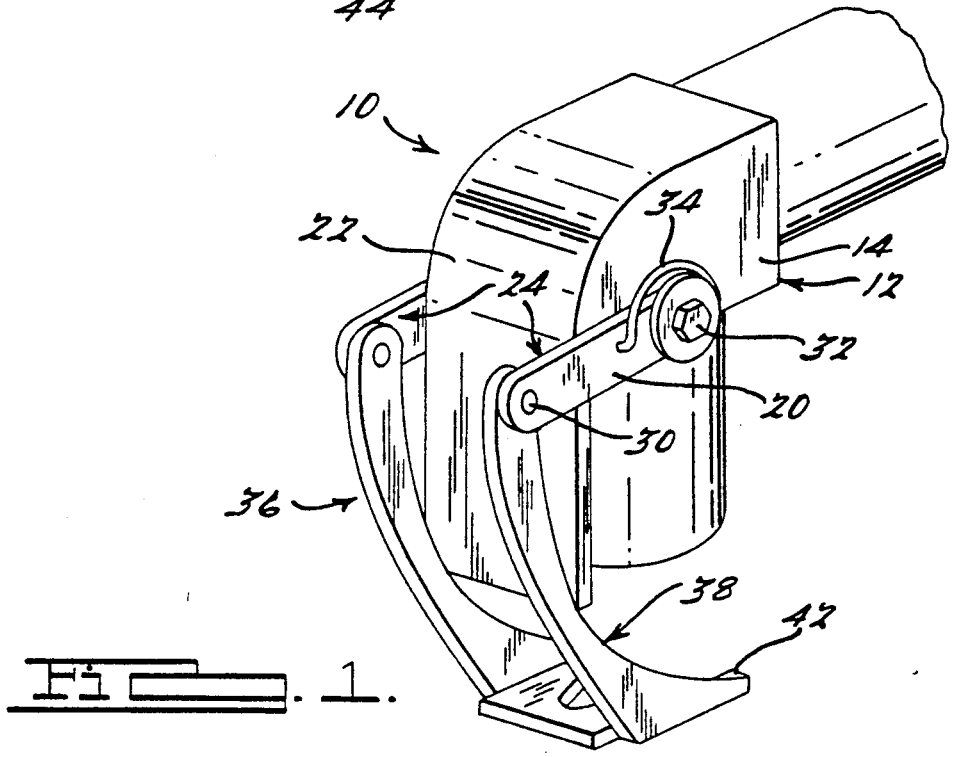

ANTI CROSS THREAD DEVICE

BACKGROUND OF THE INVENTION

1. Field of the Invention

The invention relates to socket wrench tools, and more specifically to wrench tools configured to prevent cross threading between nuts and studs.

2. Description of Related Art

It is known that many manufacturing processes call for the installation of threaded nuts onto threaded studs. Studs are fixed bolts projecting from a work piece for the purpose of fastening or location. Studs used in automated processes generally have starter points or "dog points" on their free end to aid location of the stud with the opening in the nut. Typically, a work piece containing a threaded stud is moved into a position where the stud is presented to receive a threaded nut. The work piece is held in place and a wrench tool containing a nut is advanced to the stud where the nut engages the dog point. Rotatably turning the nut with the wrench causes the nut to be run down the length of the stud thereby imparting clamp loads as is typical of threaded fasteners. The ideal wrenching process has the longitudinal axis of the stud in line with the rotation axis of the nut, thereby making it easier to locate the dog point and match the treads.

For a variety of reasons, misalignments often occur between the nut and the stud. A situation of particular concern has the nut face tilted away from perpendicularity with the axis of the stud. The rotation axis of the nut does not line up with the longitudinal axis of the stud leading to a mismatching between the nut threads and the stud threads. Some tilting of the nut relative to the stud can be tolerated without adverse consequences, but uncontrolled misalignments usually result in cross threading. The threads of the nut permanently damage the threads of the stud, or vice versa, by cutting across them rendering the fastener system ineffective or unusable.

No devices are known which have been developed specifically to prevent cross threading by automatically limiting misalignment between a nut and a stud. Many other devices are known however, that permit one handed wrenching of nuts and bolts. U.S. Pat. No. 1,097,288 to Bidinger discloses a ratchet wrench adapted with a notched portion which holds the head of a bolt thereby preventing rotation of the bolt when the nut is run down. This device, like others, requires that the nut be applied by hand before the tool can be used.

U.S. Pat. No. 1,282,523 to Bauer discloses a wrench for applying and removing nuts to bolts in inconveniently placed locations. The device has a first socket adapted to hold and rotatably turn a nut, and a fixed member with a second socket portion which opposes the nut for fixedly holding a bolt. The device is not well suited for automatically starting, and running down, a nut on a stud. The fixed member would physically interfere with the nut as the nut was run down. A clamp load would be applied to the second socket portion, and the tool would be fastened to the work piece.

It is desirable to construct a device which limits misalignment between a nut and a stud, the principle object of which being the prevention of cross threading therebetween. The value of such a device would be further enhanced if the device did not interfere with the run down of the nut on the stud.

SUMMARY OF THE INVENTION

Responsive to deficiencies in the prior art, a device for preventing cross threading between a nut and a stud by limiting the misalignment therebetween is provided. The inventive device makes use of a wrench tool for installing threaded nuts on threaded studs comprising a socket adapted at one end for rotatable engagement with a driver head and adapted at its free end for receiving the nut such that the nut face is perpendicular to the rotation axis of the socket, and a mechanism adapted to the driver head which limits misalignment between the rotation axis of the nut and the longitudinal axis of the stud to a tolerable level. Contact between the mechanism and the stud establishes and fixes the longitudinal axis of the stud relative to the wrench, providing proper starting of the nut on the stud. Contact between the mechanism and the wrench during run down causes the mechanism to be moved clear of the nut.

Permanent damage to the stud and/or nut resulting from cross threading is avoided through use of the present invention. Further, the present invention does not physically interfere with the nut during run down by moving away from the stud.

BRIEF DESCRIPTION OF THE DRAWINGS

These and other advantages will be clear to those skilled in the fastener arts upon reading the following description with reference to the accompanying drawings in which:

FIG. 1 is a perspective view of a wrench tool according to the present invention;

FIG. 2 is a partial cross sectional view of the wrench tool of FIG. 1 presenting a nut to a stud;

DETAILED DESCRIPTION OF THE PREFERRED EMBODIMENT

Figure 3:
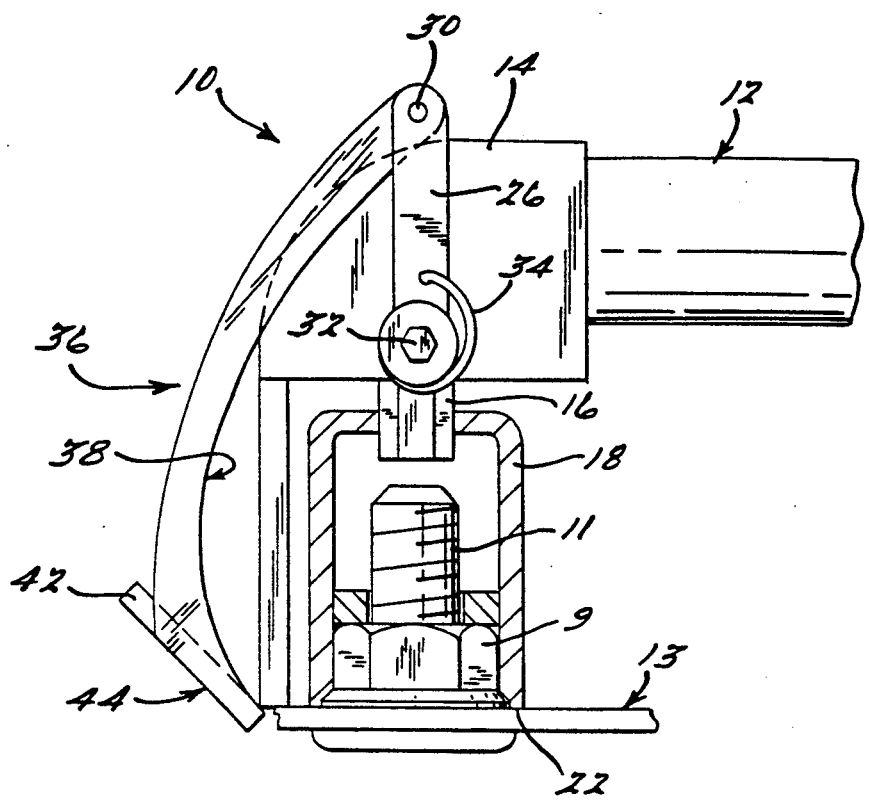
FIG. 3 is a view similar to FIG. 2 with the nut run down on the stud.

As illustrated in FIGS. 1 and 2, a wrench tool 10 comprises a driver 12 having a driver head 14 portion thereon. The driver 12 powers the rotation of a shaft member 16 which depends from a central location in the driver head 14 to drivably engage a cylindrical socket 18 at one end. Any of a number of driver types can be used. Possible choices of driver type are electrical, pneumatic, hydraulic, or manual. The socket 18 depends away from the driver head 14 and terminates in a free end 20 which is adapted to receive a threaded nut. The nut receiving free end 20 of the socket 18 can be magnetized for the purpose of holding a ferromagnetic nuts. Removable engagement between the shaft member 16 and the socket 18 can allow the use of a variety of sockets and nuts. A wall member 22 fixed to a lateral portion of the driver head 14 depends parallel to the socket 18 and terminates proximate the free end 20 of the socket 18. A clearance space is provided between the wall member 22 and the socket 18 allowing unimpeded rotation of the socket 18.

A bifurcated upper link 24 is pivotally mounted to lateral walls of the driver head 14. The upper link 24 defines parallel arms 26. The upper link 24 is mounted such that the arms are always in line with the wall member 22 of the driver head 14. Pivotal movement of the upper link 24 about the driver head 14 is accomplished by mounting the arms 26 to the driver head 14 with journals Pins 32 such that the upper link 24 clears the driver head 14. Conventional clock springs, indicated generally at 34, load the upper link 24 to resist pivotal movement away from a base position shown in FIGS. 1 and 2. Extension of the arm 26 perpendicular to the rotation axis of the socket 18 define the base position where the upper link 24 rests between process cycles. Positive stopping means can be employed on the driver head 14 to assure that the upper link 24 properly finds the base position.

An elongate bifurcated locating link 36 is journalled to the arms 26 of the upper link 24 through pins 30, and depends generally parallel with the wall member 22 of the driver head 14. The locating link 36 is mildly arched inward toward the wall member 22. An inside surface 38 of the arched locating link 36 engages the terminal end of the wall member 22 such that the locating link 36 slides against the wall member 22 as the upper link 24 is pivoted away from the base position during use. Continuous sliding engagement between the locating link 36 and the wall member 22 is accomplished by loading the locating link 36 with a second clock spring (not shown) at the junction of the journal pin 30 and the arms 26.

Figure 4:
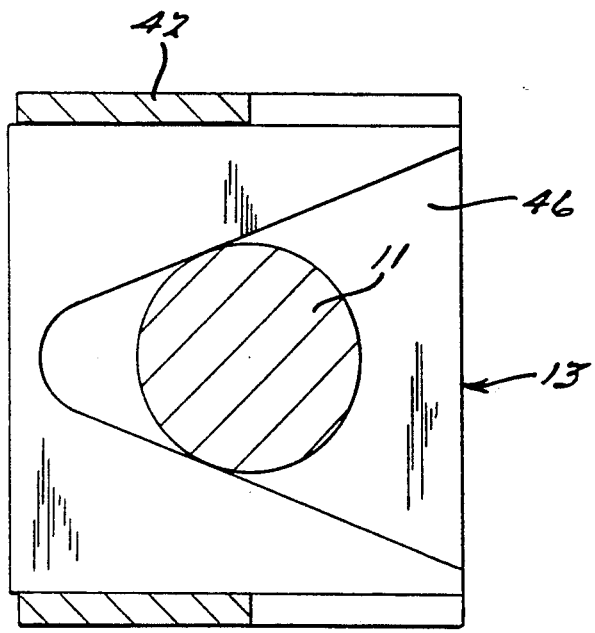
FIG. 4 is a cross sectional view taken along line 4—4 of FIG. 2.

Fixed to the terminal end of the locating link 36 is a foot element 42. In a resting position, the foot element 42 extends beyond the free end 20 of the socket 18. As may best be seen in FIG. 4, the foot element 42 defines a bottom surface 44 which is substantially planar, and a V-shaped channel 46 cut through the foot element 42 at a right angle to the bottom surface 44. The channel 46 is directed generally in line with the locating link 36.

In use, a nut 9 is installed in the free end 20 of the socket 18. A stud 11 is then presented to the wrench 10 and the wrench 10 is moved toward the stud. As the wrench 10 moves toward the stud, the foot element 42 engages a surface such as the work piece surface 13 surrounding the stud with the bottom surface 44. The bottom surface 44 is slid across the work piece surface 13 until the protruding stud 11 engages the channel 46. Coincident engagement of the bottom surface 44 to the work piece and the channel 46 to the stud establishes the longitudinal axis of the stud to the wrench 10. The wall member 22 of the driver head 14 is now slid along the arched inside surface 38 of the locating link 36 until the nut 9 engages the stud 11. Consequent to contact between the driver head 14, the linkages 24, 36, and the work piece, misalignment of the rotation axis of the nut to the longitudinal axis of the stud is limited to a level where cross threading is avoided. Turning the nut with the socket 18 runs the nut down the stud, sliding the wall member 22 further along the locating link 36. As the wall member 22 moves closer to the work piece the linkages 24, 36 rotate about their respective pivot points, moving the foot element 42 clearly away from the nut as may best be seen in FIG. 3. After the nut run down process is completed, the tool is moved away from the work piece and the linkages 24, 36 rebound to their base positions.

While only one embodiment of the wrench tool of the present invention has been disclosed, others may occur to those skilled in the fastener arts which do not depart from the scope of the following claims.

What is claimed is:

1. A wrench tool for installing threaded nuts rotatable about a rotation axis of the nut and having a nut face extending normal to the rotation axis on threaded studs having longitudinal axes, comprising;

a socket having a rotation axis adapted at one end for rotatable engagement with a driver head and adapted at its free end to receive the nut such that the nut face is perpendicular to the rotation axis of the socket;

an upper link defining, parallel depending arms, the arms being mounted at one end to the driver head for pivotal movement from a base position, the base position defined by having the arms extend perpendicularly to the rotation axis of the socket;

means for resiliently loading the upper link to resist pivotal movement away from the base position;

an elongate inwardly arched locating link journalled at one end to the upper link permitting pivotal movement between the upper link and the locating link, the locating link depending beyond the socket and slidably engaging the free end of the socket along an inside arched surface of the locating link;

means for resiliently loading the locating link to maintain slidable engagement between the locating link and the socket; and a foot element fixed to the free end of the locating link for establishing the relative position of the longitudinal axis of the stud to the tool, the foot element defining a bottom surface for locating a work piece surface in surrounding relationship to the stud and a V-shaped channel perpendicularly disposed to the bottom surface for locating surfaces along the stud.

2. A wrench tool as defined in claim 1 wherein the socket is magnetized.

3. A wrench tool as defined in claim 2 wherein the loading means are leaf springs.

4. A wrench tool as defined in claim 1 wherein the foot member is adapted to carry a generally V-shaped tongue for selective accommodation of a variety of stud diameters and lengths.

5. A wrench tool for installing threaded nuts rotatable about a rotation axis of the nut and having a nut face extending normal to the rotation axis on threaded studs having longitudinal axes, comprising;

a socket having a rotation axis adapted at one end for rotatable engagement with a driver head and adapted at its free end for receiving the nut such that the nut face is perpendicular to the rotation axis of the socket;

a head cover, fixedly secured in surrounding relationship to the driver head, having a wall element depending parallel to and spaced laterally from the socket and terminating proximate the free end of the socket;

an upper link defining, parallel depending arms, the arms being mounted at one end to the head cover for pivotal movement from a base position, the base position defined by having the arms extend perpendicularly to the rotation axis of the socket;

means for resiliently loading the upper link to resist pivotal movement away from the base position;

an elongate inwardly arched locating link journalled at one end to the upper link permitting pivotal movement between the upper link and the locating link, the locating link depending beyond the socket and slidably engaging the terminal end of the depending wall element along an inside arched surface of the locating link;

means for resiliently loading the locating link in order to maintain slidable engagement between the locating link and the depending wall element; and a foot element fixed to the free end of the locating link for establishing the relative position of the longitudinal axis of the stud to the tool, the foot element defining a bottom surface for locating a work piece surface in surrounding relationship to the stud and a V-shaped channel perpendicularly disposed to the bottom surface for locating surfaces along the stud.

6. A wrench tool as defined in claim 5 wherein the socket is magnetized.

7. A wrench tool as defined in claim 6 wherein the loading means are leaf springs.

8. A wrench tool as defined in claim 6 wherein the foot member is adapted to slidably carry a generally V-shaped tongue for selective accommodation of a variety of stud diameters and lengths.

* * * * *